United States Patent [19]

Lee

[11] Patent Number: 5,762,352
[45] Date of Patent: Jun. 9, 1998

[54] BICYCLE FORK HAVING A FIBER REINFORCED STEERER TUBE AND FIBER REINFORCED CROWN AND BLADES AND METHOD OF MAKING SAME

[76] Inventor: Kyu-Wang Lee, 15 Deer Meadow Ct., Danville, Calif. 94506

[21] Appl. No.: 616,366

[22] Filed: Mar. 15, 1996

[51] Int. Cl.[6] .................................................. B62K 21/04
[52] U.S. Cl. ............................................ 280/280; 280/288.3
[58] Field of Search ...................................... 280/279, 280, 280/288.3

[56] References Cited

U.S. PATENT DOCUMENTS

| | | | |
|---|---|---|---|
| 312,732 | 2/1885 | Knous et al. | 280/279 |
| 345,465 | 7/1886 | Waite | 280/279 |
| 366,287 | 7/1887 | Yost et al. | 280/279 |
| 589,147 | 8/1897 | Sturges | 280/280 |
| 593,814 | 11/1897 | De Rango | 280/279 |
| 609,937 | 8/1898 | Kelly | 280/280 |
| 649,633 | 5/1900 | Fauber | 280/280 |
| 660,875 | 10/1900 | Wambach | 280/279 |
| 1,998,992 | 4/1935 | Johnson et al. | 280/280 |
| 2,120,453 | 6/1938 | Anderson | 280/152.1 |
| 2,561,710 | 7/1951 | Pawsat | 280/279 |
| 3,039,791 | 6/1962 | Horowitz et al. | 280/279 X |
| 3,493,240 | 2/1970 | Jenks | 280/610 |
| 3,641,230 | 2/1972 | Jenks | 264/152 |
| 3,833,242 | 9/1974 | Thompson, Jr. | 280/281 |
| 4,008,903 | 2/1977 | Ramond | 280/279 |
| 4,062,917 | 12/1977 | Hill et al. | 264/102 |
| 4,079,957 | 3/1978 | Blease | 280/278 |
| 4,183,776 | 1/1980 | Staub et al. | 156/156 |
| 4,493,749 | 1/1985 | Brezina | 156/187 |
| 4,627,307 | 12/1986 | Yamazawa | 74/552 |
| 4,657,795 | 4/1987 | Foret | 428/36 |
| 4,662,645 | 5/1987 | McMurtrey | 280/279 |
| 4,724,115 | 2/1988 | Freeman | 264/513 |
| 4,740,346 | 4/1988 | Freeman | 264/258 |
| 4,828,285 | 5/1989 | Foret et al. | 280/279 |
| 4,828,781 | 5/1989 | Duplessis et al. | 264/250 |
| 4,859,607 | 8/1989 | Trimble | 280/281.1 |
| 4,889,355 | 12/1989 | Trimble | 280/281.1 |
| 4,902,458 | 2/1990 | Trimble | 264/46.6 |
| 4,923,203 | 5/1990 | Trimble et al. | 280/288.3 |
| 4,941,674 | 7/1990 | Trimble | 280/281.1 |
| 5,016,895 | 5/1991 | Hollingsworth et al. | 280/280 |
| 5,039,470 | 8/1991 | Bezin et al. | 264/255 |
| 5,343,973 | 9/1994 | Lanker | 280/781 |

*Primary Examiner*—Brian L. Johnson
*Assistant Examiner*—Avraham Lerner
*Attorney, Agent, or Firm*—Dergosits & Noah LLP

[57] ABSTRACT

A bicycle fork including a hollow metal steerer tube connected to a generally hollow unitary crown and blade component made of fibrous resin material. The crown and blades are molded so as to form a continuous structure of fibrous resin material having two opposing wall sections. The inside of the steerer tube is lined with fibrous resin material which is moldedly bonded to the crown to form a continuous and integral unit of fibrous resin material.

13 Claims, 11 Drawing Sheets

BICYCLE FORK HAVING A FIBER REINFORCED STEERER TUBE AND FIBER REINFORCED CROWN AND BLADES AND METHOD OF MAKING SAME

TECHNICAL FIELD

The present invention relates to a bicycle fork and to methods of making such forks. More particularly, the present invention relates to a bicycle fork having a metal steerer tube internally lined with a fiber reinforced resin material that is continuously connected to a crown and blade component made with the same fiber reinforced resin material.

BACKGROUND OF THE INVENTION

The conventional front fork of bicycle is usually made of metal and consists of three main components, the steerer tube, fork crown, and a pair of blades. A pair of rakes (or dropouts or fork ends) are connected to the lower ends of the blades in order to attach the front wheel assembly to the fork. In conventional metal forks, the connections between these components may be made by welding, braising, adhesive bonding or friction joining such as shrinking or swaging fitting. A high performance bicycle fork is desired to be light and mechanically strong. A fork made entirely of steel parts is disadvantageous because it weighs approximately 1.5 pounds or more and is considered too heavy to be used with a high performance road bicycle.

In order to overcome this weight disadvantage of all-steel forks, efforts have been made to reduce the amount of steel used in bicycle forks. Such efforts have included the manufacture of bicycle forks made of composite materials comprising a resin reinforced by a fibrous material. For example, Bezin et al., U.S. Pat. No. 5,039,470 discloses a bicycle fork comprising metal and fiber reinforced plastic parts wherein the fork head and the pair of blades are molded in one piece by laying up polymer impregnated fiber reinforced sleeves on polymer impregnated flexible foam over foam core. Foam cores of either hard or soft foam and flexible foam core having an internal pressurization have been included.

Foret et al., U.S. Pat. No. 4,828,285 discloses a process of making a bicycle fork in the form of a molded assembly in one piece forming the steerer head, the fork head and the two blades wherein the textile reinforcement is constituted by bidirectional braided tubes that contain longitudinal yarns disposed parallel to the main axis of the fork. The heat curable resin is then injected into the textile reinforcement and molded.

While the bicycle forks of Bezin et al. and Foret et al. have some advantages over conventional metal forks, they have some serious deficiencies which impede their ability to be used as a high performance road bicycle. The foam cores are left inside the forks and they add significant weight to the forks. The mechanical testing reveals that molded materials that are made by foam cores do not have good mechanical properties because of poor consolidation of the fibrous resin. This is due to in part the presence of irregularities in the foam and the premature deformation of foam during the pressurization process of molding.

Another problem associated with bicycle forks made of fibrous resin composite material is the stress concentrations at the joints between the different fork components. Because of the geometry of a bicycle fork, the relatively high loads bearing imposed on the blades is transferred from the blades through the crown to the steerer tube. Because of the small interface area between the crown and the cylindrical base of conventional steerer tubes, the levels of stress in this interface area is significantly increased over average stress levels in the other areas of the fork and therefore prior art forks often fail in or adjacent to this area. Stress concentrations in these small interface areas may be further increased because of the differences in the CTE's (Coefficient of Thermal Expansion) of the materials used at the interface where a metal steerer tube is interfaced with a crown made out of fibrous resin composite material. The differences in CTE's results in disbonding, cracks in the interface, and a poor mechanical properties creating weak joints at the interface. During the molding process, the heat curing of fibrous resin materials and the subsequent cooling process may result in disbonding and cracking at the interface. A repeated thermal cycling especially under the influence of load bearing worsens the problem.

Hollingsworth, et al., U.S. Pat. No. 5,016,895 attempted to solve the foregoing problem with forks made of fibrous resin composite materials and cure the deficiencies of bicycle forks such as those of Bezin et al. and Foret et al. Hollingsworth et al. discloses a bicycle fork comprising a steerer tube assembly connected to a crown and blade component made of resin impregnated fibrous material and molded in one piece is disclosed. The fork of Hollingsworth et al. utilizes a steerer tube having a unique foot portion at its base which is flared and includes depending legs extending down to the fork blades. An illustration of the foot portion of the steerer tube and crown component of the Hollingsworth et al. fork is shown in FIG. 1. The crown and blade component is made of "prepreg" (resin pre-impregnated fibrous material), and molded by an internal pressurization method using a Nylon bladder that is inflated by introducing compressed air. The bladder is taken out after the molding process. This type of molding method is commercially used for making tubular structures such as tennis rackets, badminton rackets, etc. While the fork made by this method may provide some benefits over conventional metal forks and over the forks made of foam cores, they have some deficiencies.

One of the problems with the fork of Hollingsworth et al. is that the steerer tube assembly consists of a tubular portion 2 and an anchor means 4 wherein the anchor means includes anchor members 4a and 4b extending radially beyond the tubular portion 2 of the steerer tube. Such anchor means or "yoke" structure adds extra weight to the fork. Another problem with the fork disclosed in Hollingsworth, et al. is that the extension of a metal steerer tube to include a metal anchor means results in an increase in metal surface area to which fibrous resin composite material is bonded. Thus, the load on the crown area of the fork is concentrated at the bond between the metal anchor means 4 and the fibrous resin material of the crown 6. Because this bond is a weak due to the differences in the CTE's of the metal steerer tube and fibrous resin crown, the connection between the steerer tube and the crown and blade components is also weak.

The problems associated with the differences in the CTE's of these two materials is even more pronounced in situations where a hollow steerer tube without an anchor means is moldedly bonded to a crown and blade component made of fibrous resin composite material. In this situation, the metal steer tube has a cylindrical base with very little surface area available for bonding which leads to disbonding and weak joints at the interface of the metal steerer tube and the crown component.

The present invention overcomes the foregoing deficiencies with conventional bicycle forks and the prior art forks made of composite materials such as resin reinforced by a fibrous material. The bicycle fork of the present invention has overcome this problem by forming a unitary, continuous fibrous resin layer extending from the steerer tube, through the crown and blade components. Although the bicycle fork of the present invention includes an interfacial bonding between a metal steerer tube and a fibrous resin material layer inside the tube, the bonding surface area between these two materials is large. As a result, the load bearing on the blades and transmitted to the steerer tube through the crown is distributed across a larger interfacial surface area between the steerer tube and crown so that the stress concentration on the bond between the steerer tube and the crown is delocalized. This results in a bicycle fork having a stiffer steerer tube, especially in the crown area, and a stronger bond between the steerer tube and the crown and blade components. Further, this is accomplished without any extra increase in the weight of the fork.

SUMMARY OF THE INVENTION

It is therefore an object of the invention to provide a new and improved bicycle fork that is light weight.

It is another object of the invention to provide a new and improved bicycle fork that is less expensive to manufacture.

It is yet another object of the invention to provide a new and improved bicycle fork that has greater strength and durability because of a stiffer steerer tube and increased surface area between the fibrous resin material and the inside surface of the steerer tube.

These and other objects and advantages are accomplished by a bicycle fork including a hollow steerer tube, a generally hollow crown and blade component made of fibrous resin material. The crown and blade component are molded so as to form a substantially continuous wall of a fibrous resin material. The steerer tube has a bottom end and an inside surface that is lined with a moldedly bonded fibrous resin material. The fibrous resin material forms a base at the bottom end of the steerer tube. The bottom end of the steerer tube is cut to conform to the curvature of one of the opposing crown wall sections to which it is adhesively secured. The base of the fibrous resin material lining the inside surface of the steerer tube is moldedly bonded to the crown wall section to which the steerer tube is adhesively secured to form a continuous and integral unit of fibrous resin material.

In another embodiment of the invention, the inside surface of the crown is lined with strands of fibrous resin material which reinforce the connection between the steerer tube and the crown.

The various features of the present invention will be best understood, together with further objects and advantages by reading the following description with reference to the accompanying drawings.

DETAILED DESCRIPTION OF THE INVENTION

Figure 1:
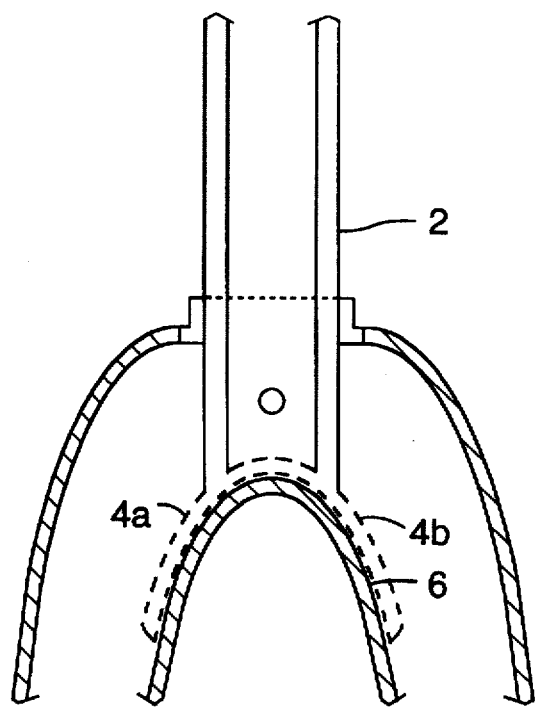
FIG. 1 is a front cross-sectional view of the foot portion of the steerer tube assembly and crown portion of a prior art bicycle fork.
Figure 2:
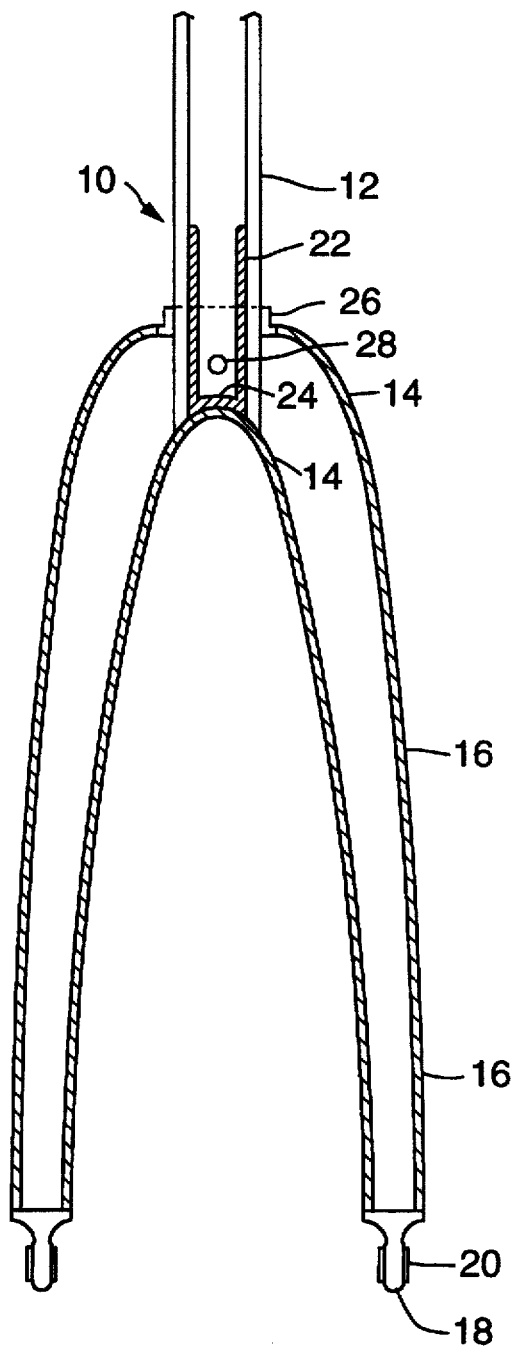
FIG. 2 is a front cross-sectional view of the bicycle fork made in accordance with the present invention.

Referring now to FIG. 2, the bicycle fork 10 of the present invention includes a hollow steerer tube 12, a crown component 14 and a pair of blades 16. The crown 14 and the blades 16 are molded from fibrous resin material by the method described more fully below. At the lower end of each blade 16 is an insert forming a pair of fork-ends 18 which are secured in a socket in the ends of the blades 16, either by being molded in place or by later being secured by conventional means known to those skilled in the art. Each of the fork-ends 18 has a slot or aperture 20 for receiving a corresponding end of the front wheel axle (not shown) in the same manner as the ends of conventional forks. The steerer tube 12 is lined on its inside surface with a moldedly bonded fibrous resin layer 22. The steerer tube 12 is connected to the crown 14 at the bottom end of the steerer tube by a moldedly bonded fibrous resin base layer 24 which extends across the inside diameter of the steerer tube 12 and is convex to conform to the curvature of the inside surface of the crown 14. The steerer tube 12 is further secured in crown 14 by crown race 26. An aperture 28 passes through both the lower end of the steerer tube 12 and the base portion of the crown 14 for receiving a bolt on which is mounted a front brake assembly (not shown) by conventional means.

Figure 3:
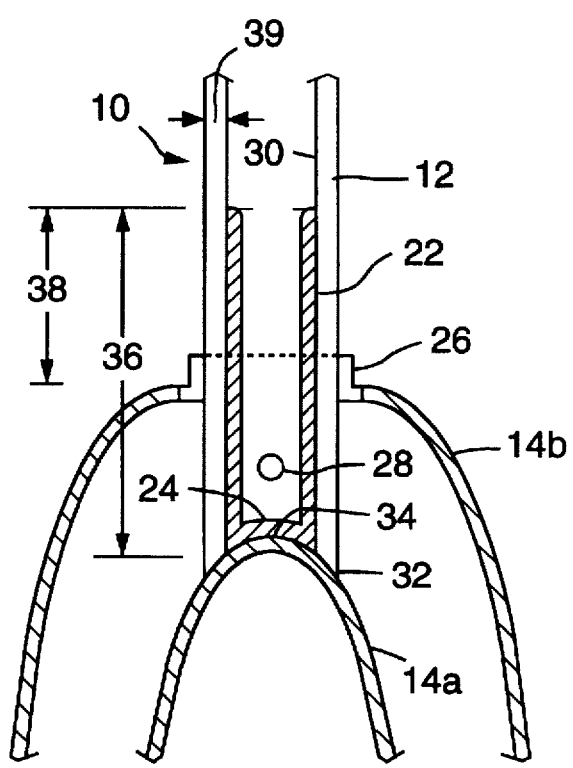
FIG. 3 is a front cross-sectional view of the foot portion of the steerer tube and crown portion of a bicycle fork made in accordance with the present invention.

As can best be seen in FIG. 3, contrary to the forks of the prior art, the bicycle fork of present invention results in a bicycle fork with a stiffer steerer tube and a stronger bond between the steerer tube and the crown component while reducing the overall weight of the fork. In a preferred embodiment, the steerer tube 12 has a uniform outside cylindrical diameter and does not include a yoke or anchor means, or any other member extending radially outward from the steerer tube at its bottom end which is moldedly bonded to the crown component 14. Instead, the steerer tube 12 has a cylindrical inside surface 30 that is lined with a layer of fibrous resin material 22 at the lower portion of the steerer tube. This layer of fibrous resin material 22 reinforces the steerer tube 12 and improves the bonding with the crown and blade components. As a result, steerer tube 12 is stiffer and stronger than the steerer tubes of the prior art.

While the preferred embodiment of the present invention utilizes a steerer tube having a cylindrical cross-section and one inch outer diameter, it is contemplated that steerer tubes having larger outer diameters and other cross-sectional shapes may be used and are within the knowledge of those skilled in the art.

In a preferred embodiment, the inside surface 30 of the lower portion, defined by length 36, of the steerer tube 12 is lined with a fibrous resin material 22 that extends from the bottom end 32 of the steerer tube 12 to a distance 38 approximately one inch above the top of the crown race 26. The length 36 of the fibrous resin material lining may vary depending upon the desired stiffness of the steerer tube. However, in a preferred embodiment, the total length 36 of the fibrous resin material lining the lower portion of the inside surface 30 of the steerer tube 12 is approximately two inches. The selection of length 36 is within the knowledge of those skilled in the art.

Further, the layer of fibrous resin material 22 preferably extends around the entire inside surface 30 of the lower portion of the steerer tube 12. However, the layer of fibrous resin material 22 may cover less than the entire inside surface 30 of the lower portion of the steerer tube 12. In this embodiment, the layer of fibrous resin material 22 consists of strands or strips of fibrous resin material. In another embodiment, the fibrous resin material 22 may also completely fill the cavity inside the lower portion of the steerer tube 12.

In a preferred embodiment, a metal steerer tube is used because it is relatively light and can be made inexpensively. The steerer tube 12 has a cylindrical cross-sectional shape and may be constructed from steel, magnesium, berillium, aluminum, aluminum alloy, titanium or CR-MO (Chrome Molybdenum) commercially available from suppliers such as the Tange Company, Osaka, Japan. Preferably, a CR-MO steerer tube with a wall thickness 39 of 1.5 to 2.5 mm is used. The lower portion 36 of the steerer tube 12 may be reinforced by butting to prevent the failure of the steerer tube 12 caused by bending and/or torsional loads that are transferred from the blade component (not shown) through the crown 14. However, the butting of the lower portion 36 of the steerer tube 12 is not always necessary. In fact, the lower portion of the steerer tube may be unbutted, partially butted or fully butted. In a preferred embodiment, the lower portion 36 of the steerer tube 12 is butted so that the total thickness 39 of tube wall is approximately 2.5 to 5 mm.

The thickness of the layer of fibrous resin material 22 will vary depending upon whether the lower portion 36 of the steerer tube 12 is butted. The thickness of the layer of fibrous resin material 22 decreases proportionately with the increase in thickness of the butting of the steerer tube. That is, the layer of fibrous resin material is thicker for unbutted tubes than for partially butted or fully butted steerer tubes.

A metal steerer tube is also widely used because the crown race 26 on which bearings (not shown) are fitted for the head tube of the bicycle frame (also not shown) can be easily installed. The crown race 26 is typically made from steel and is attached to the steerer tube 12 by welding, braising, adhesive bonding and other methods known to those skilled in the art.

Crown 14 is generally hollow and interfaces with the blades 16 (shown in FIG. 2) and the steerer tube 12. Crown 14 includes an inner crown side wall 14a and an outer crown side wall 14b. The steerer tube bottom end 32 is cut in a convex pattern so as to correspond to the curvature of the inside surface 34 of the inner crown side wall 14a at its apex. The steerer tube bottom end 32 is moldedly bonded to the inside surface 34 of the inner crown side wall 14a at the apex by the methods described more fully below.

The end of the fibrous resin material layer 22 at the cut end 32 of the steerer tube 12 forms a base of fibrous resin material 24 which is conformal to the shape of the apex of the crown to which it is moldedly bonded. In the embodiment where the fibrous resin layer 22 consists of two opposing strips of material, the ends of the strips of fibrous resin material layer 22 at the cut end 32 of the steerer tube 12 form a wall or bridge of fibrous resin material 24 between the two opposing strips of the fibrous resin layer 22.

Fibrous resin layer 24 acts as an interface between the steerer tube 12 and the crown 14 which is in addition to the interface between the cut end 32 of the steerer tube 12 and the crown 14. This interfacial fibrous resin layer 24 eliminates the problems discussed above that are associated with the bond between the cut end 32 of the metal steerer tube and the crown 14 made of fibrous resin composite material. Fibrous resin layer 24 is moldedly bonded to the inside surface 34 of the inner crown side wall 14a by the methods described more fully below so as to form a continuous, unitary fibrous resin structure consisting of the fibrous resin layer 22 lining the inside surface 30 of the steerer tube 12, the fibrous resin layer 24 and the inner crown side wall 14a. In short, the attachment of the steerer tube 12 to the crown 14 and blade component 16 results in the formation of a continuous structure of fibrous resin material extending from blade component 16, to the crown inner side wall 14a, to the interfacial fibrous resin layer 24 to the fibrous resin layer 22 lining the inside surface of the steerer tube 12. This continuous, unitary structure of fibrous resin material distributes the load bearing on the blades (not shown) and transmitted to the steerer tube through the crown to a larger interfacial surface area of the steerer tube 12 and crown 14 so that the stress concentration on the bond between the steerer tube and the crown is delocalized.

The method of molding the fork of the present invention will now be described with reference to FIGS. 4 and 5. The steerer tube is lined (or molded) with the fibrous resin layer prior to the molding process of the crown and blade component. Alternatively, the steerer tube can be molded simultaneously with the crown and blade component.

Figure 4:
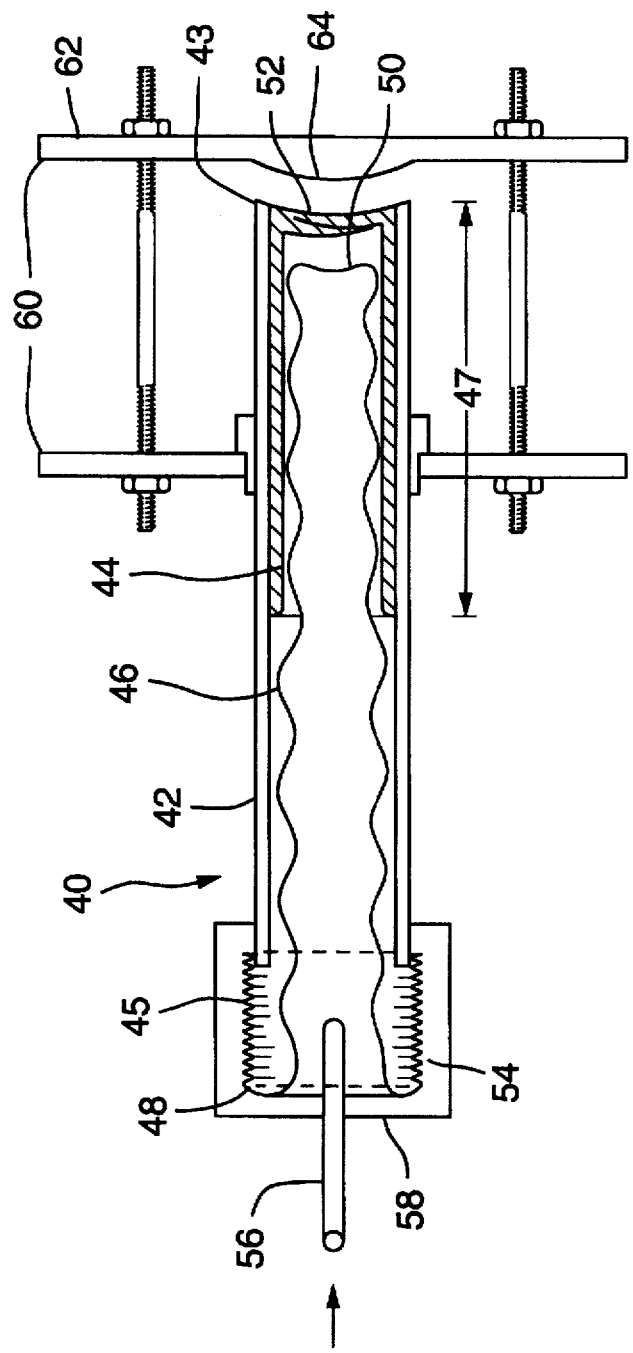
FIG. 4 is a cross-sectional view of a vice clamp used to mold the fibrous resin material lining the inside of the steerer tube prior to the molding of the crown and blade components.

FIG. 4 shows an example of a mold 40 that may be used to line the inside surface of a steerer tube with fibrous resin material prior to molding with the crown and blade component. Steerer tube 42 having a threaded end 45 is cut at the opposite end 43 to form a convex shape that is conformal to the curvature of the inside surface of the inner crown side wall (not shown) to which the end of the steerer tube 42 is ultimately bonded. The cut end 43 of the steerer tube is plugged during the molding process. The lower portion of steerer tube 42 near the cut end 43 is lined with fibrous resin material by laying up prepreg sheets 44 around a nylon bladder 46 prior to insertion of the bladder 46 into the inside of the steerer tube 42. Nylon bladder 46 has an open end 48 and a sealed end 50. Nylon bladders such as that shown in FIG. 4 are commercially available and are commonly used for molding fibrous resin material.

The prepreg is preferably unidirectional carbon prepreg and is cut and laid up over the bladder 46 in a 0 degree orientation along the axis parallel to the length of the steerer tube. However, 45 degree or minus 45 degree orientation of unidirectional prepreg could be used in addition to the 0 degree orientation prepreg. Multiple plies of 200 gram grade, high strength carbon fiber prepreg are used, preferably in the range of five to fifteen plies. This type of prepreg is readily available from the Toray Company, Tokyo, Japan. If a heavier grade prepreg is used, then fewer number of plies of prepreg will be required. The weight of prepreg designates the number of grams of material per square meter. Other types of carbon prepreg is available from the Fiberite Company, Orange, Calif. The reinforcement fiber could be carbon fiber, glass fiber, aromatic polyamide fiber such as Kevlar™ from DuPont, polyethylene fiber such as Spectra™ from Allied Chemical, New Jersey. The resin component could be thermoset resins such as epoxy, vinyl ester, unsaturated polyester or thermoplastic resins such as PPS (polyphenylene sulfide), polysulfone, PEEK (polyetheretherketone),and polyamideimide. The resin content of the composite material is preferably in the range of about 30–40%, more preferably about 32–35%. A higher fiber content of the composite material without voids is preferred because it makes a stronger composite structure after the curing process.

The prepreg sheets are wound around the bladder 46 so as to completely encapsulate the sealed end 50 of the bladder. The length 47 of the prepreg sheets may vary depending upon the desired stiffness of the steerer tube 42. As shown in FIG. 4, at the sealed end 50 of the bladder, the sheets of prepreg that are wound around the bladder are overlapped at their ends 52 so as to form a double layer of prepreg at the cut end 43 of the steerer tube 42 which encapsulate the sealed end 50 of the bladder 46. The ends 52 of prepreg are folded on top of one another inside of the steerer tube 42 in such a way that after curing, the folded portion of prepreg consolidates to form a wall or bridge of fibrous resin material having uniform thickness that extends across the inside transverse circumference of the steerer tube 12.

After the prepreg is wound around the bladder 46, the bladder is inserted into the steerer tube 42 from the threaded end 45 of the steerer tube to the cut end 43 of the steerer tube. The bladder 46 is inserted into the steerer tube so that the folded ends 52 of prepreg encapsulating the sealed end 50 of the bladder do not extend beyond the cut end 43 of the steerer tube. The open end 48 of the bladder 46 is wrapped around the outside of the threaded end 45 of the steerer tube. A threaded cap 54 is secured to the threaded end 45 of the steerer tube to secure the bladder 46 in place. Cap 54 has an air tube 56 that extends through the cap end 58.

Once the bladder 46 with the pre-wound prepreg 44 is in place inside the steerer tube 42, the steerer tube is secured in vice clamp 60 so that the cut end 43 of the steerer tube abuts against the wall 62 of vice clamp 60. The center portion 64 of the vice clamp 60 is curved to conform to the curvature of both the cut end 43 of the steerer tube and the inside surface of the inner crown side wall (not shown) to which the steerer tube is ultimately bonded. Compressed air is then introduced into the bladder 46 through the air tube 56. The bladder 46 becomes inflated with the compressed air which causes the prepreg sheets to expand and cover the entire circumference of the inside surface of the middle and lower portions of the steerer tube 42. The prepreg is then cured in an oven or a hydraulic press at around 250° F. for about 60 to 90 minutes. The pressure of the compressed air may be in the range of 50 to 150 psi, preferably, in the range of 100 to 150 psi. The compressed air is introduced at ambient temperature or at a slightly elevated temperature in the range of about 60° to 80° degrees C. which helps the prepreg expand and cure more smoothly. Once the prepreg has cured inside the steerer tube 42, the bladder 46 is removed from the inside of the steerer tube 42. The steerer tube is then molded to the crown and blade components which have been previously laid up with prepreg sheets as described below.

Figure 5:
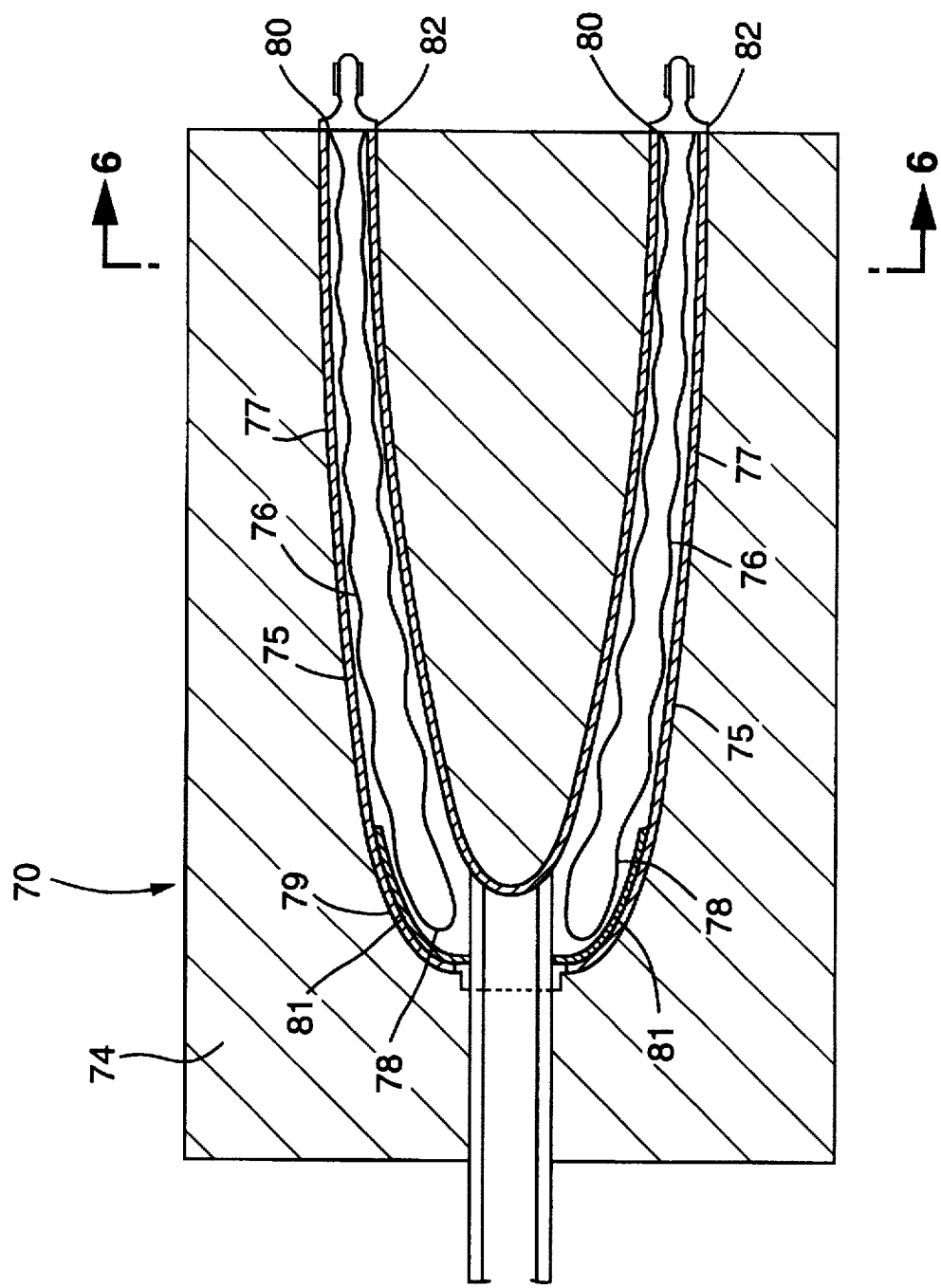
FIG. 5 is a cross-sectional view of the bottom mold used to mold the prepreg of the crown and blade components.
Figure 6:
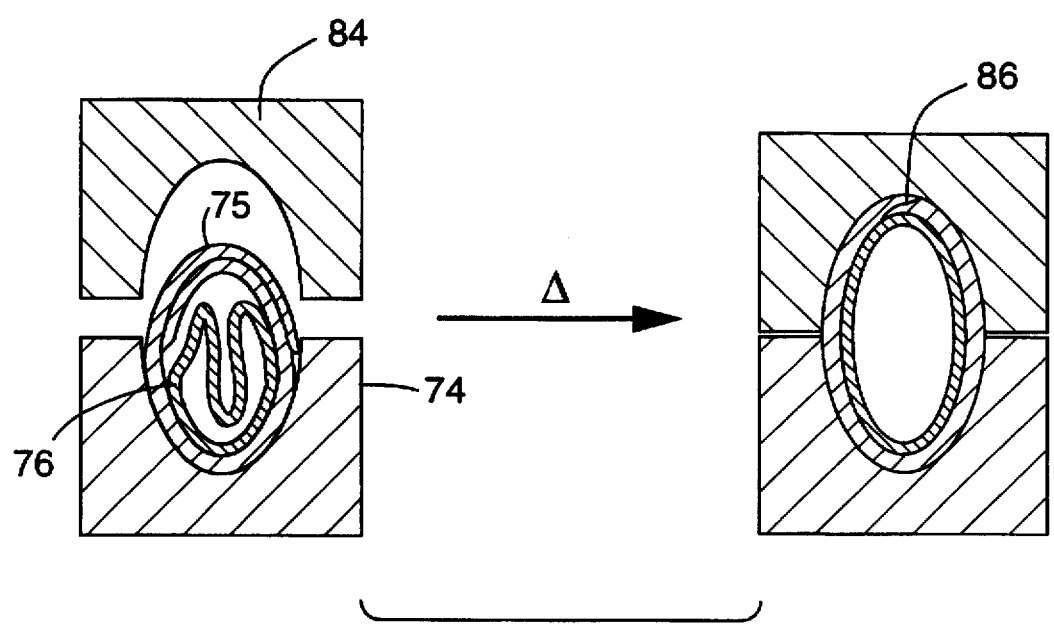
FIG. 6 is a cross-sectional view taken along lines 6—6 of FIG. 5 with the mold opened and closed around the fork lay-up.

As shown in FIGS. 5 and 6, the crown and blade components are molded using a two piece clam-shell mold 70. Only the bottom half of the mold 74 is shown in FIG. 5. A single layer of bidirectional carbon prepreg or fabric (not shown) is laid-up on the entire surface of the cavity in the bottom half of the mold 74. Because of the curvature in the crown area of the mold, the bidirectional prepreg is cut at the edges of certain areas of the fabric and the cut edges are overlapped so that the fabric is laid-up flat onto the surface of the cavity in the bottom half of the mold 74. The size of the bidirectional fabric is at least as large as the surface area of the cavity in the bottom mold 74 in order to eliminate any uncovered seams when the top and bottom halves of the molds are closed. A similar layer of bidirectional carbon prepreg or fabric is laid up on the entire surface of the cavity in the upper half of the mold (not shown) following the same procedure. Likewise, the size of the bidirectional fabric is at least as large as the surface area of the cavity in the upper mold in order to eliminate any uncovered seams when the top and bottom halves of the molds are closed. The bidirectional prepreg is used as an outer layer mainly for aesthetic purposes since its woven structure is dimensionally stable and the fork can be made to show the fiber patterns without much fiber distortion. Preferably, the bidirectional layer of prepreg is Toray 3K fiber with fiber orientations of 0 and 90 degrees.

Next, a sheet of multiple-ply of unidirectional prepreg 75, preferably four to six plies, is laid up in the cavity of the bottom half of the mold on top of the single layer of bidirectional prepreg. As shown in FIG. 6, the width of the unidirectional prepreg sheet 75 in the blade portion of the mold is large enough so that there is sufficient excess material to wrap entirely around the bladder 76 and fill the cavity of the top mold half 84 when the mold is closed. This results in a single overlapping edge 86 extending longitudinally along the blades. Because the width of the prepreg sheet laid-up in blade portion of the bottom half 74 of the mold is large enough to fill the blade cavities in both the bottom half 74 and the top half 84 of the mold, no prepreg is laid-up in the blade portion of the top half 84 of the mold prior to closing the mold.

Since multiple plies of prepreg sheets of identical widths are laid-up simultaneously, each ply of prepreg wraps around the bladder and overlaps itself in different lengths. In other words, the bottom ply of unidirectional prepreg (the layer adjacent to the bidirectional layer of prepreg) overlaps itself more than the top ply of unidirectional prepreg. This results in a smooth and gradual nesting of a single overlapped area. This prevents the formation of thick, aesthetically unpleasant seams extending longitudinally along the blades. In this regard, it is also contemplated that a single longitudinally extending overlap could be positioned at any place around the transverse circumference of the molding cavity when the top and bottom halves of the molds are closed. Although in the preferred embodiment the transverse diameter of the blades is in the shape of an airfoil, other shapes may be used which are known to those skilled in the art.

Referring back to FIG. 5, the width (not shown) of the unidirectional prepreg sheet 75 in the crown section 79 of the mold is narrower than the width (not shown) of the prepreg in the blade portion 77. However, the width of the prepreg sheet 75 is wide enough to completely cover the inside surface of the cavity of the crown section 79 in the bottom half 74 of the mold. In the corresponding crown section cavity of the upper half of the mold (not shown in FIG. 5), a six ply sheet of unidirectional prepreg is laid-up over the single ply of bidirectional prepreg. Again, the prepreg sheet in the crown section of the upper half of the mold is wide enough to completely fill the crown cavity in the top half of the mold. Thus, when the molds are closed, there are two junctures of overlapped edges extending longitudinally in the crown portion.

An additional sheet of unidirectional prepreg (not shown in FIG. 5) may be used to reinforce the crown section 79. In this embodiment, an additional sheet of multiple ply unidirectional prepreg is laid-up in the crown section 79 of the bottom mold 74 directly on top of the previously laid-up multiple ply sheet of unidirectional prepreg. Preferably, this additional sheet of prepreg consists of two plies. However, it is contemplated that prepreg sheets consisting of more than two plies may be used depending upon the desired strength of the crown. The selection of the number of plies is within the knowledge of those skilled in the art.

The unidirectional prepreg is cut in the direction of the carbon fiber orientation and is applied in several layers. The fiber may be oriented in 0, 90, 45, minus 45, 60, minus 60, 30 or minus 30 degree directions. The selection of prepreg fiber orientation, number of plies, thickness and type of prepreg depends upon the desired strength of the fork and is within the knowledge of those skilled in the art.

In a preferred embodiment also shown in FIG. 5, additional strands or strips 81 of unidirectional prepreg may be laid-up along the longitudinal edge of the bottom half 74 of the mold along the outer side wall of the crown section 79 such that approximately one half of the width of the prepreg strip extends above the edge of the bottom half of the mold. Thus, when the molds are closed and the prepreg is cured, half of the prepreg strands 81 moldedly bond to the inside surface of the crown outer side wall in the bottom mold 74 and the other half of the prepreg strands 81 moldedly bond to the inside surface of the crown outer side wall in the top mold. Thus, prepreg strands 81 span across the seam formed by the prepreg sheets 75 laid-up in the crown section 79 underneath strands 81. These additional prepreg strands 81 reinforce the seams formed in the crown outer side wall during curing. These prepreg strands 81 are optional and are not a necessary component of the fork of the present invention. This embodiment is described below in more detail in reference to FIGS. 9 and 10.

Referring back to FIG. 5, after the multiple-ply unidirectional prepreg 75 is laid up in the bottom half of the mold 74 (and prepreg strands 81 if used), and the steerer tube previously laid-up with fibrous resin material (not shown) is secured in the bottom mold 74, deflated bladders 76, each having a sealed end 78 and an open end 80, are then placed on top of the prepreg layer 75. The top and bottom molds are then closed and the bladders inflated with compressed air through the open ends 80 of the bladders 76. Inflation of the bladders 76 causes the prepreg layer to expand to cover the surface of entire circumference of the mold cavity. The prepreg is then cured at around 250° F. for about 60 to 90 minutes. The pressure of the compressed air may be in the range of 50 to 150 psi, preferably, in the range of 100 to 150 psi. Once the prepreg has cured, bladders 76 are removed from the inside of the mold. A pair of fork ends (not shown) are then secured to the open ends 82 of blades 77.

Figure 7:
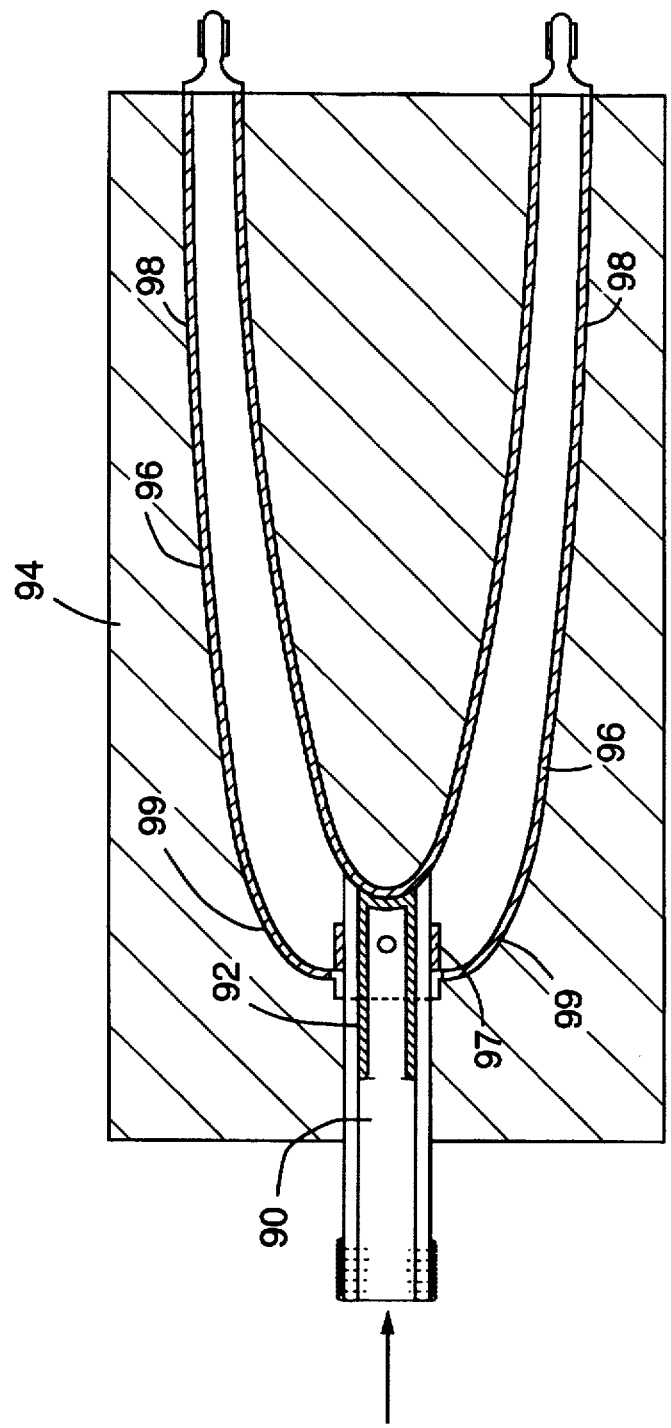
FIG. 7 is a cross-sectional view of the bottom mold used to mold the prepreg of the crown and blade components with the previously molded steerer tube secured in place.

As shown in FIG. 7, the steerer tube 90 with previously cured fibrous resin layer 92 inside the lower portion of the tube, is secured in the bottom mold 94 by conventional methods. Once the steerer tube 90 is secured in the bottom mold 94, the top mold (not shown) is clamped down on bottom mold 94 and the prepreg 96 in the blades 98 and the crown 99 are cured by the methods described above with reference to FIG. 5. In a preferred embodiment as shown in FIG. 7, the lower portion of the steerer tube that is secured inside the crown area can be further reinforced by spirally winding strand 97 of unidirectional prepreg around the outside surface of the lower portion of the tube.

Figure 8:
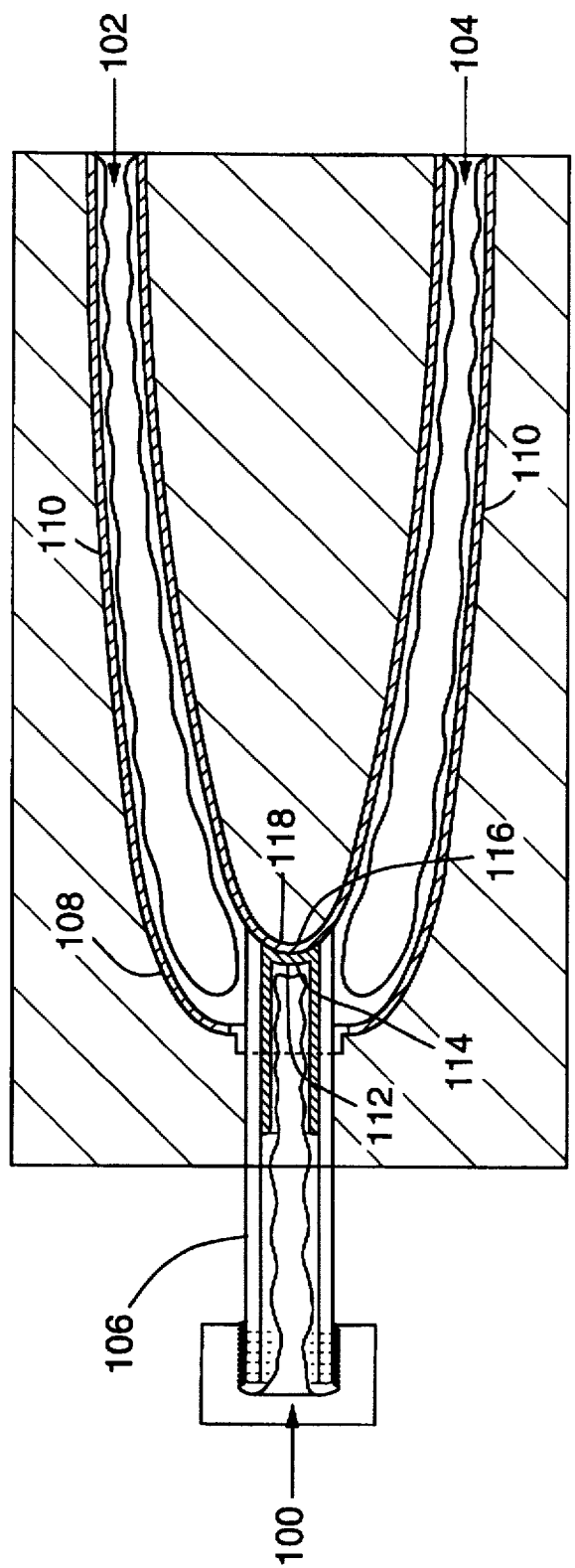
FIG. 8 is a cross-sectional view of the bottom mold used in the simultaneous molding of the prepreg lining the inside of the metal steerer tube and the prepreg laid-up in the crown and blade component of the mold.

In an alternative embodiment, the prepreg laid-up inside the steerer tube as described above with reference to FIG. 4, may be cured simultaneously with the prepreg layer laid-up in the crown and blade components as described above with reference to FIG. 5. In this embodiment, as shown in FIG. 8, the steerer tube with uncured prepreg material inside the middle to lower portion of the tube is laid up to the mold on which the prepreg for the crown and blade components is already laid up as described above. Compressed air is then introduced into the three openings 100, 102 and 104 and the prepreg in the steerer tube 106, 108 and 110 is cured at 250° F. for 60 to 90 minutes. In this embodiment, the juncture 112 formed between the prepreg 114 of the steerer tube 106 and the prepreg 116 of the inner surface of the crown inner side wall 118, is moldedly bonded so as to form a unitary and integral unit of fibrous resin material.

Regardless of whether the prepreg inside the steerer tube is cured prior to or simultaneous with the curing of the prepreg sheets laid up in the crown and blade component mold, both molding processes result in the formation of a continuous structure of fibrous resin composite material from the inner lining of the steerer tube down to the fibrous resin layer of the crown and blade component of the fork. As a result, the bonding surface area between the inner surface of the metal steerer tube and the crown is large and thus the load on the crown area when the bicycle is ridden is delocalized.

In another embodiment of the present invention as briefly described above with reference to FIG. 5, the crown component of the bicycle fork may be reinforced with additional strips or strands of prepreg. This embodiment can be best seen in FIGS. 9 and 10. These reinforcement strands of prepreg provide increased bending and torsional strength in the crown which minimizes the twisting action of the fork when a lateral load is applied to the fork during operation of the bicycle.

Figure 9:
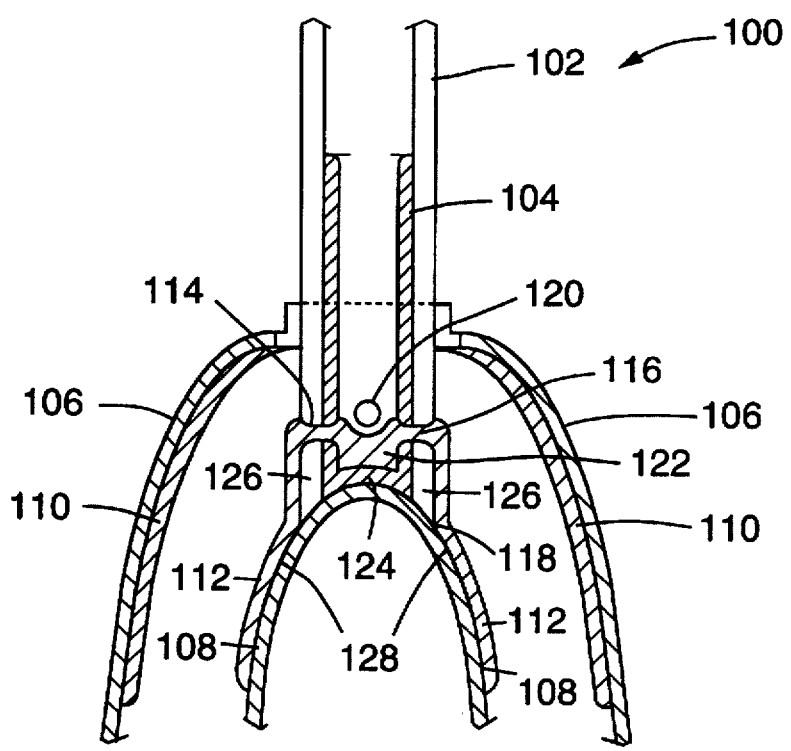
FIG. 9 is a front cross-sectional view of the foot portion of the steerer tube and crown portion of a bicycle fork made in accordance with a second embodiment of the present invention.
Figure 10:
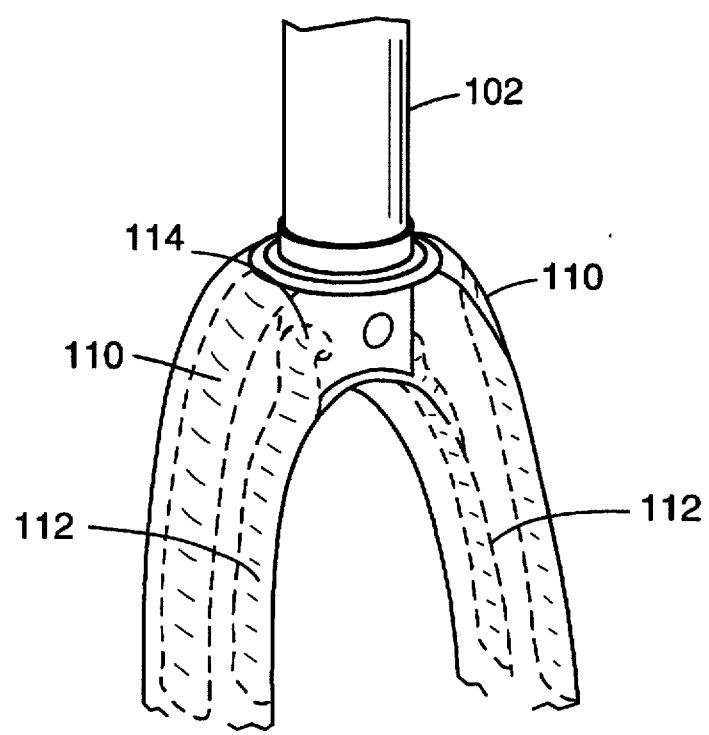
FIG. 10 is a perspective view partially broken away of the foot portion of the steerer tube and crown portion of a bicycle fork made in accordance with a second embodiment of the present invention.

Referring now in particular to FIG. 9, the bicycle fork 100 includes a steerer tube 102 that is lined with a fibrous resin layer 104 as described above. The outer crown side wall 106 and the inner crown side wall 108 are laid up and molded with bidirectional and unidirectional prepreg according to the methods described above. Prepreg strands 110 are moldedly bonded to the inside surface of the outer crown side wall 106. Each of the prepreg strands 110 are approximately ¾ inch×4 inch strips of four to six ply unidirectional prepreg. It is contemplated that one skilled in art may vary the width and length of prepreg strands 110 depending upon the desired torsional strength in the crown.

Another single strand 112 of four to six plies of unidirectional prepreg is tunneled through holes 114 and 116 in the bottom portion of the steerer tube 102 near the cut end 118 of the tube. Holes 114 and 116 are drilled through the steerer tube at a location between the cut end 118 of the steerer tube 102 and the front brake assembly aperture 120. The holes 114 and 116 are approximately ⅛ inches in height and approximately ¼ inches wide. The section of the prepreg strand 112 that tunnels through the steerer tube 102 extends downward to the cut end 118 of the steerer tube to form a U-shaped section 122. U-shaped section 122 is moldedly bonded to the bridge section 124 of the prepreg that lines the inside surface of the steerer tube 102. The sections of the prepreg strand 112 that extend outside the steerer tube 102 are moldedly bonded to the outside surface 126 of the bottom portion of the steerer tube 102 and the inside surface 128 of the inner crown side wall 108. Prepreg strand 112 may be cut into a strip that is approximately ½ inch wide and 8 inches long. It is contemplated that one skilled in art may vary the width and length of prepreg strand 112 depending upon the desired torsional strength in the crown.

Prepreg strands 110 and prepreg strand 112 are laid up in the bottom mold (not shown) during the lay up procedures describe above for the crown and blade components. Prepreg strands 110 are laid up on top of the unidirectional prepreg layer forming the crown. Similarly, prepreg strand 112 is tunneled through the holes 114 and 116 in the steerer tube and laid up on top of the prepreg 124 that is laid up during the procedure described above for laying up the prepreg inside the steerer tube simultaneously with the crown and blade components. Because the width of prepreg strand 112 is wider than holes 114 and 116, prepreg strand 112 needs to be rolled prior to tunneling through the holes 114 and 116. However, during the curing process, prepreg strand 112 unravels and forms a flat layer of prepreg along the outside surface of the bottom portion of the steerer tube 102 and the inside surface 128 of the inner crown side wall 108. The ends of the prepreg 112 strand that extend outside the steerer tube 102 are laid up in the bottom mold (not shown) to the outside surface 126 of the bottom portion of the steerer tube 102 and the inside surface 128 of the inner crown side wall 108.

Once all of the prepreg layers and strands have been laid up, the prepreg is cured according to the procedures set forth above with reference to FIGS. 4, 5, 7 and 8. Referring now to FIG. 9, the bladder (not shown) that is used to cure the fibrous resin material lining the steerer tube when inflated compresses the U-shaped section 122 of prepreg against the bridge section 124 of prepreg so that the U-shaped section 122 of prepreg and the bridge section 124 of prepreg consolidate during curing. Further, the bladders (not shown) that are used to cure prepreg laid-up in the crown and blade mold compress the sections of the prepreg strand 112 that extend outside the steerer tube 102 against the outside surface 126 of the bottom portion of the steerer tube 102 and the inside surface 128 of the inner crown side wall 108 so that these sections of the prepreg strand moldedly bond to these surfaces during curing. Although this embodiment is described using prepreg strands 110 and prepreg strand 112, it is contemplated that prepreg strands 110 may be used without prepreg strand 112 and vice versa depending upon the desired bending and torsional strength of the steerer tube.

In a preferred embodiment, the lower portion of the steerer tube 102 underneath prepreg strand 112 can be further reinforced by winding strands of unidirectional prepreg (not shown in FIGS. 9 or 10) around the outside surface of the lower portion of the tube.

Figure 11:
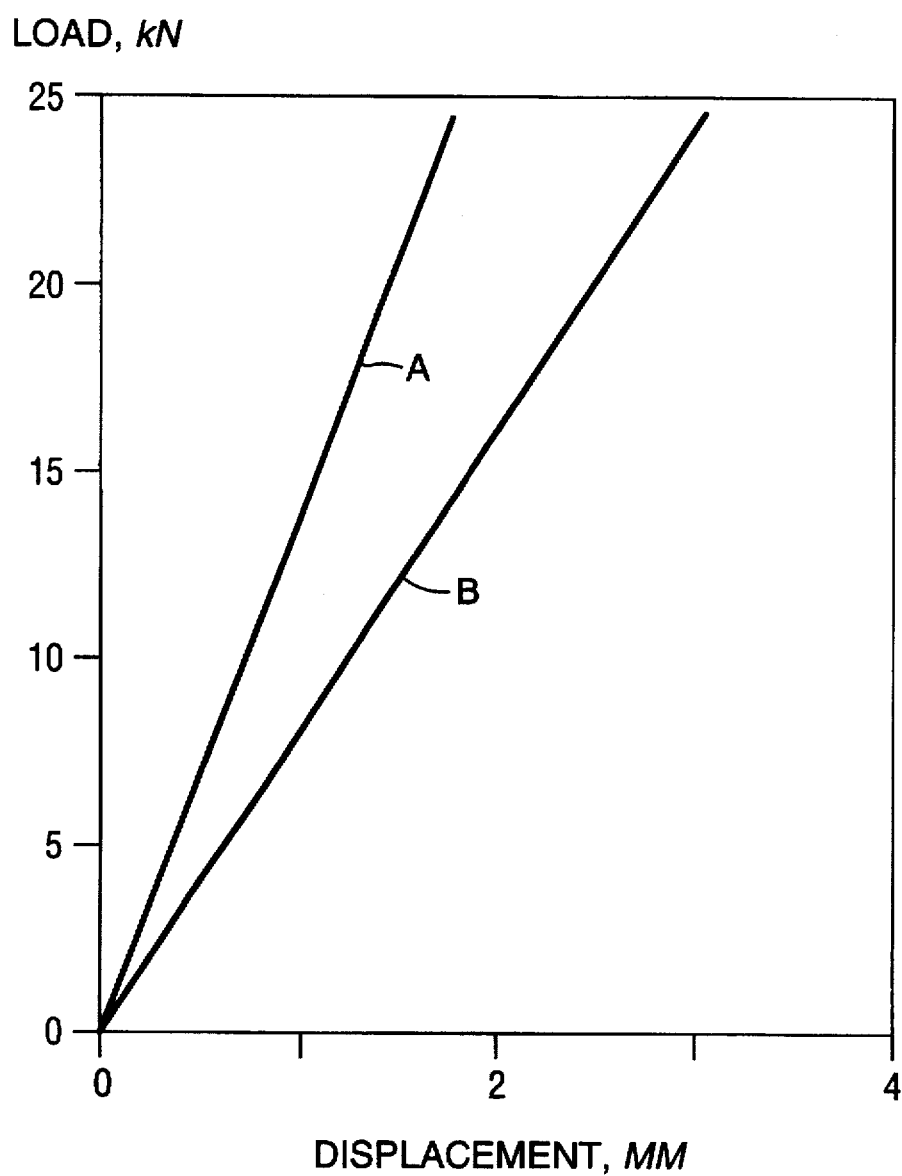
FIG. 11 is a graph of test results plotting Young's moduli from three point bending experiments comparing the torsional deflection of a fork made according to the present invention with conventional forks assemblies.

To test the flexual strength of the fork of the invention for comparison with conventional forks, a three point bending experiment was conducted. As shown on the graph in FIG. 11, a CR-MO steerer tube that is lined with twelve plies of 200 gram grade carbon prepreg (line A) shows a 50% increase in the stiffness over the CR-MO steerer tube without the carbon prepreg layer (line B) by the measurement of Young's moduli. A similar experiment using a titanium tube resulted in the same trend.

Further, the fork made by the present invention has a strong bonding between the steerer tube and the crown and blade component as evidenced by fatigue testing with cyclic forward/aft load testing. The actual test for measuring the fatigue strength is known to those skilled in the art. The results of this test show that a fork made according to the present invention having a steel steerer tube with an inner lining of fibrous resin composite material that is connected continuously to the fiber/resin component of crown and blade area according to the preferred embodiment of the present invention did not fail after 300,000 cycles. Racing bicycles are required to have a minimum of 50,000 cycles by DIN.

While the present invention has been described in detail by way of illustration and example for purposes of clarity of understanding, it will be understood by those skilled in the art that certain changes and modifications may be made to the above-described embodiments without departing from the spirit of the invention and scope of the appended claims.

What is claimed is:

1. A bicycle fork comprising a hollow steerer tube, a generally hollow crown and blades, the blades being made from a cured layer of fibrous resin material, the crown having an outer side wall and an inner side wall made from a cured layer of fibrous resin material, the steerer tube having an open bottom end without laterally extending and projecting legs that is cut to conform to the curvature of the crown inner side wall to which the bottom end is moldedly bonded and an inside surface that is partially lined with a layer of moldedly bonded fibrous resin material, wherein the layer of fibrous resin material lining the inside surface of the steerer tube at the cut end of the steerer tube forms a base of fibrous resin material closing said open bottom end, and which is moldedly bonded to the crown inner side wall to form a continuous and integral unit of fibrous resin material.

2. The bicycle fork of claim 1 wherein the blade component further comprises fork ends for attaching to a wheel assembly.

3. The bicycle fork of claim 1 wherein the fibrous resin material comprises a fiber component selected from the group consisting of carbon fiber, glass fiber, aromatic polyamide fiber, polyethylene fiber.

4. The bicycle fork of claim 3 wherein the fibrous resin material comprises a thermoset resin.

5. The bicycle fork of claim 3 wherein the fibrous resin material comprises a thermoplastic resin.

6. The bicycle fork of claim 4 wherein the fibrous resin material comprises a resin component selected from the group consisting of epoxy, vinyl ester, unsaturated polyester.

7. The bicycle fork of claim 5 wherein the fibrous resin material is selected from the group consisting of polyphenlylene sulfide, polysulfone, polyetherether ketone and polyamideimide.

8. The bicycle fork of claim 1 wherein the steerer tube is composed of material selected from the group consisting of steel, magnesium, berillium, chrome molybdenum, titanium, aluminum and aluminum alloy.

9. The bicycle fork of claim 1 wherein the crown inner side wall has an inside surface that is lined with a moldedly bonded strand of fibrous resin material.

10. The bicycle fork of claim 9 wherein the steerer tube further comprises an outside surface and a pair of diameterically opposed holes through the tube near the tube bottom end for receiving a strand of fibrous resin material that is moldedly bonded to the base of the fibrous resin material layer lining the inside of the steerer tube and is further moldedly bonded to the outside surface of the steerer tube near the tube bottom end and the crown inner side wall.

11. The bicycle fork of claim 1 wherein a strand of cured fibrous resin material is spirally wound around the outside surface of the steerer tube near the tube bottom end.

12. The bicycle fork of claim 10 wherein a strand of cured fibrous resin material is spirally wound around the outside surface of the steerer tube below the diametrically opposed holes and above the tube bottom end.

13. A bicycle comprising a hollow steerer tube, a generally hollow crown and blades, the blades being made from a cured layer of fibrous resin material, the crown having an outer side wall and an inner side wall made from a cured layer of fibrous resin material, the steerer tube hailing a longitudinal axis and an open bottom end without laterally extending and projecting legs that is cut to conform to the curvature of the crown inner side wall to which the bottom end is moldedly bonded and an inside surface that is partially lined with a layer of moldedly bonded fibrous resin material having a fiber orientation substantially parallel to the longitudinal axis of the steerer tube, wherein the layer of fibrous resin material lining the inside surface of the steerer tube at the cut end of the steerer tube forms a base of fibrous resin material closing said open bottom end, and which is moldedly bonded to the crown inner side wall to form a continuous and integral unit of fibrous resin material.

* * * * *